United States Patent
Zhang

(10) Patent No.: US 11,210,680 B2
(45) Date of Patent: Dec. 28, 2021

(54) DEVICES FOR SINGLE ACTION, AUTOMATED PERSONAL EVENT REGISTRATION AND INFORMATION DISPLAY, PERSONAL

(71) Applicant: Xiaolin Zhang, Wellesley, MA (US)

(72) Inventor: Xiaolin Zhang, Wellesley, MA (US)

( * ) Notice: Subject to any disclaimer, the term of this patent is extended or adjusted under 35 U.S.C. 154(b) by 0 days.

(21) Appl. No.: 17/090,974

(22) Filed: Nov. 6, 2020

(65) Prior Publication Data
US 2021/0056565 A1    Feb. 25, 2021

Related U.S. Application Data

(63) Continuation-in-part of application No. 15/838,462, filed on Dec. 12, 2017, now abandoned.

(51) Int. Cl.
| | |
|---|---|
| *G06Q 30/02* | (2012.01) |
| *G06Q 30/00* | (2012.01) |
| *H04W 4/02* | (2018.01) |
| *H04W 4/23* | (2018.01) |
| *H04W 60/04* | (2009.01) |
| *G06K 7/10* | (2006.01) |
| *G06Q 10/10* | (2012.01) |
| *G09F 3/02* | (2006.01) |
| *G09F 9/30* | (2006.01) |

(Continued)

(52) U.S. Cl.
CPC ..... *G06Q 30/0185* (2013.01); *G06K 7/10316* (2013.01); *G06Q 10/109* (2013.01); *G06Q 30/0252* (2013.01); *G06Q 30/0267* (2013.01); *G09F 3/02* (2013.01); *G09F 9/30* (2013.01); *G09F 21/023* (2020.05); *H04W 4/026* (2013.01); *H04W 4/23* (2018.02); *H04W 4/80* (2018.02); *H04W 60/04* (2013.01); *G09F 9/33* (2013.01); *G09F 9/35* (2013.01); *G09F 2003/0279* (2013.01)

(58) Field of Classification Search
CPC .......... G06Q 30/0185; G06Q 30/0252; H04W 4/026; H04W 4/23; H04W 4/04; H04W 4/80; G06K 7/10316; G09F 3/02; G09F 3/30
USPC ...................................................... 705/14.5
See application file for complete search history.

(56) References Cited

U.S. PATENT DOCUMENTS

| | | | |
|---|---|---|---|
| 2007/0129959 A1* | 6/2007 | Bransky | G06Q 10/10 455/73 |
| 2010/0123560 A1* | 5/2010 | Nix | H04Q 9/00 340/10.4 |

(Continued)

OTHER PUBLICATIONS

Finley, Klint, These Digital Name Badges Are a Data Mining Bonanza, dated Oct. 24, 2013, downloaded Aug. 4, 2020 from https://www.wired.com/2013/10/conference-badges/ (Year: 2013).*

(Continued)

*Primary Examiner* — Scott D Gartland
(74) *Attorney, Agent, or Firm* — Daniel A. Tesler

(57) ABSTRACT

The user wearable devices are configured to allow attendees of events to exchange their information upon a simultaneous input into their respective device. The simultaneous inputs initiate a verification that the two users are registered for and present at the same event before initiating a pairing through single direction short range antennas. The simultaneous inputs can also verify whether the two users are facing one another and an appropriate distance apart to coordinate the simultaneous input.

8 Claims, 12 Drawing Sheets

(51) Int. Cl.
*G09F 21/02* (2006.01)
*H04W 4/80* (2018.01)
*G09F 9/35* (2006.01)
*G09F 9/33* (2006.01)

(56) References Cited

U.S. PATENT DOCUMENTS

| | | | | |
|---|---|---|---|---|
| 2011/0304437 | A1* | 12/2011 | Beeler | H01Q 1/2216 340/10.1 |
| 2013/0154826 | A1* | 6/2013 | Ratajczyk | H04M 19/047 340/539.11 |
| 2014/0358632 | A1* | 12/2014 | Graff | G06Q 30/0224 705/7.29 |
| 2015/0286832 | A1* | 10/2015 | Gibson | G06F 21/335 726/28 |
| 2018/0111353 | A1* | 4/2018 | Huppert | B32B 5/024 |
| 2019/0028149 | A1* | 1/2019 | Pifferi | H04B 5/0031 |
| 2021/0235273 | A1* | 7/2021 | Pierson | G01S 5/0284 |

OTHER PUBLICATIONS

Snell, Jason, The Making of the Futurestack Badge, dated Nov. 18, 2013, downloaded Aug. 4, 2020 from https://blog.newrelic.com/product-news/making-futurestack-badge/ (Year: 2013).*

Taptrack, Practical NFC Range Limitations, dated Feb. 24, 2017, downloaded from https://www.taptrack.com/article/whitepaper/nfc-range-limitations/on Aug. 5, 2020 (Year: 2017).*

Quora, answers to What is the maximum distance for NFC communication? dated Apr. 30, 2016, downloaded Aug. 5, 2020 from https://www.quora.com/What-is-the-maximum-distance-for-NFC-communication (Year: 2016).*

Chandler, Nathan, How Stuff Works, What's an NFC tag?, prior to 2014, downloaded Aug. 5, 2020 from https://electronics.howstuffworks.com/nfc-tag.htm#:~:text=NFC%20is%20a%20lot%20like,their%20range%20is%20too%20short (Year: 2014).*

Dg-tag, homepage screenshot from www.dgtag360.com (Year: 2020) (Year: 2020).*

Dg-tag, Archive.org screenshot of Ad slide indicating the dgtag360 slideshow was available at least by Oct. 13, 2016, downloaded Aug. 4, 2020 from http:/Aveb.archive.org/web/20 161013145744/http:/Avww.dgtag360.com/ (Year: 2016).*

Dg-tag, Archive.org screenshot of ID card slide indicating the dgtag360 slideshow was available at least by Oct. 13, 2016, downloaded Aug. 4, 2020 from http:/Aveb.archive.org/web/20 161013145744/http:/Avww.dgtag360.com/ (Year: 2016).*

Cvent, An Essential Guide to Event Badges, dated Nov. 19, 2019, downloaded from https://www.cvent.com/en/blog/events/essential-guide-event-badges on Aug. 25, 2021 (Year: 2019).*

* cited by examiner

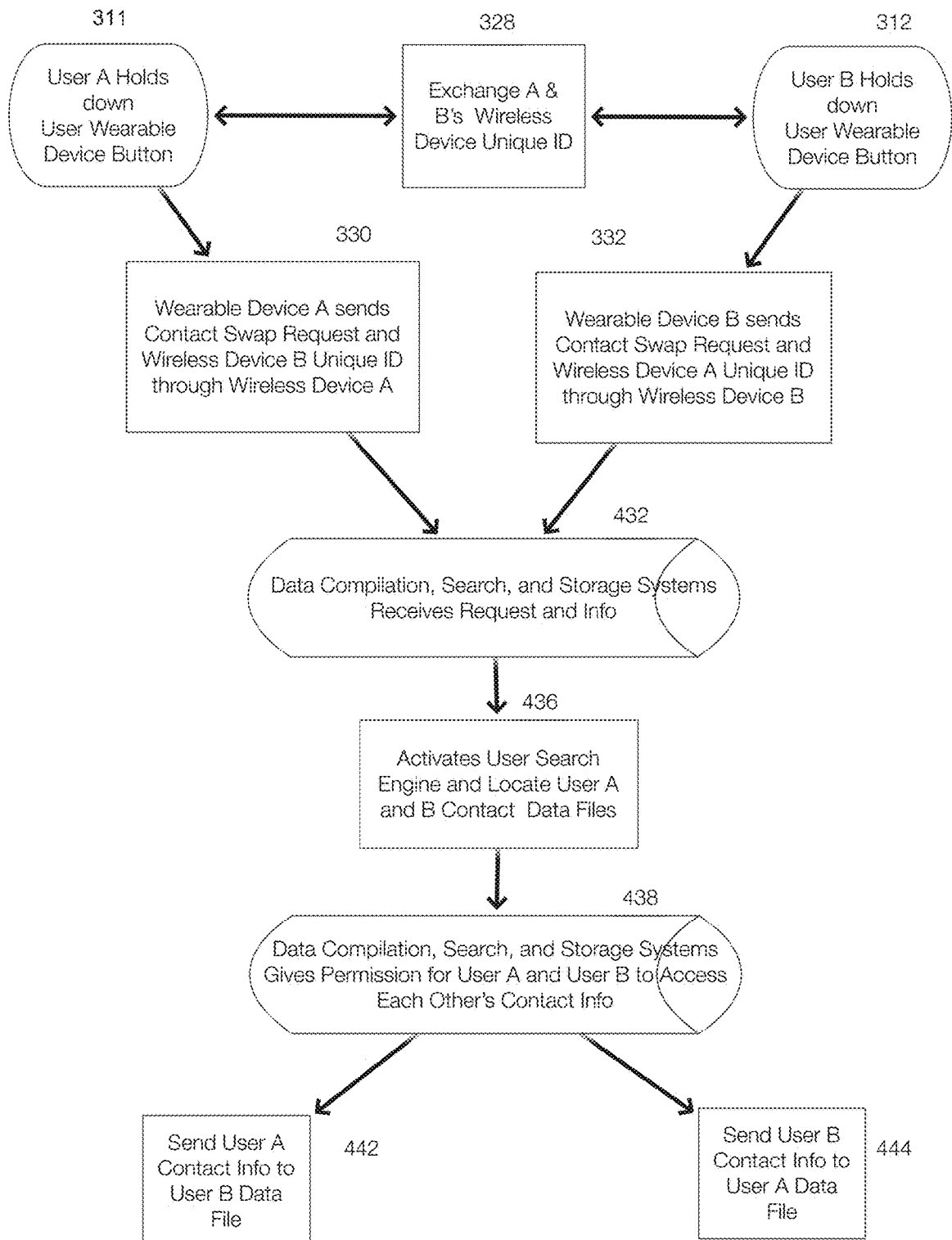

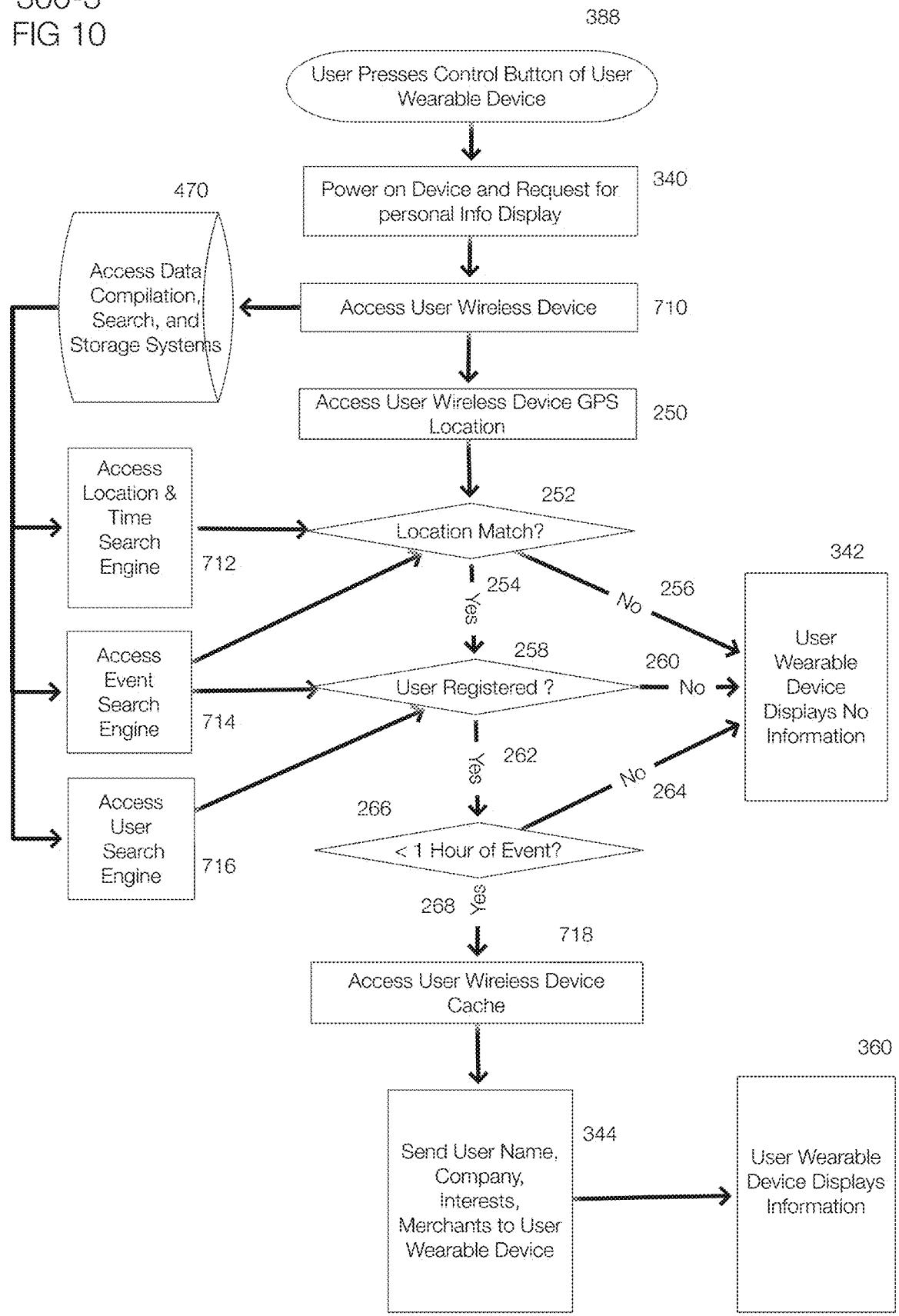

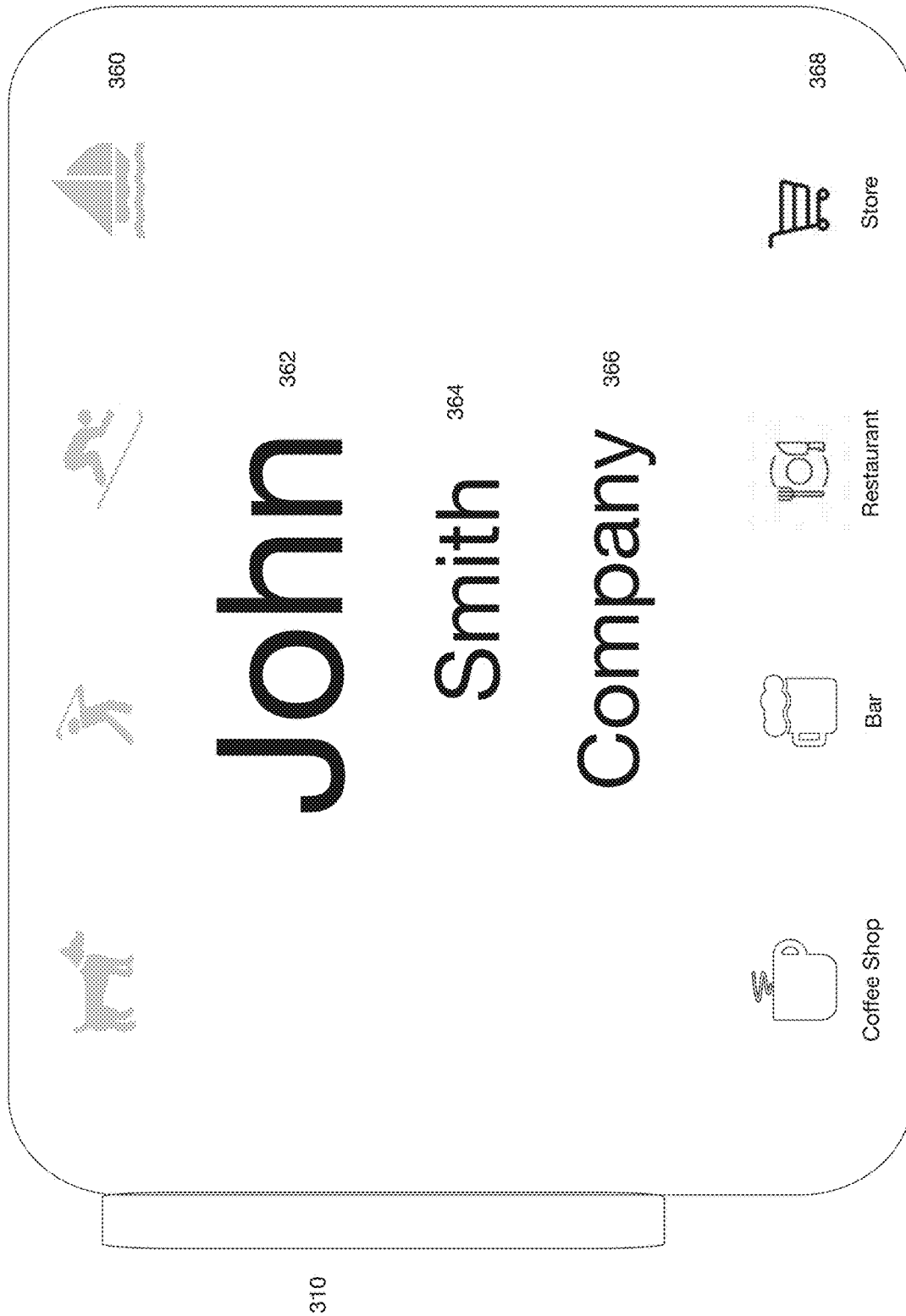

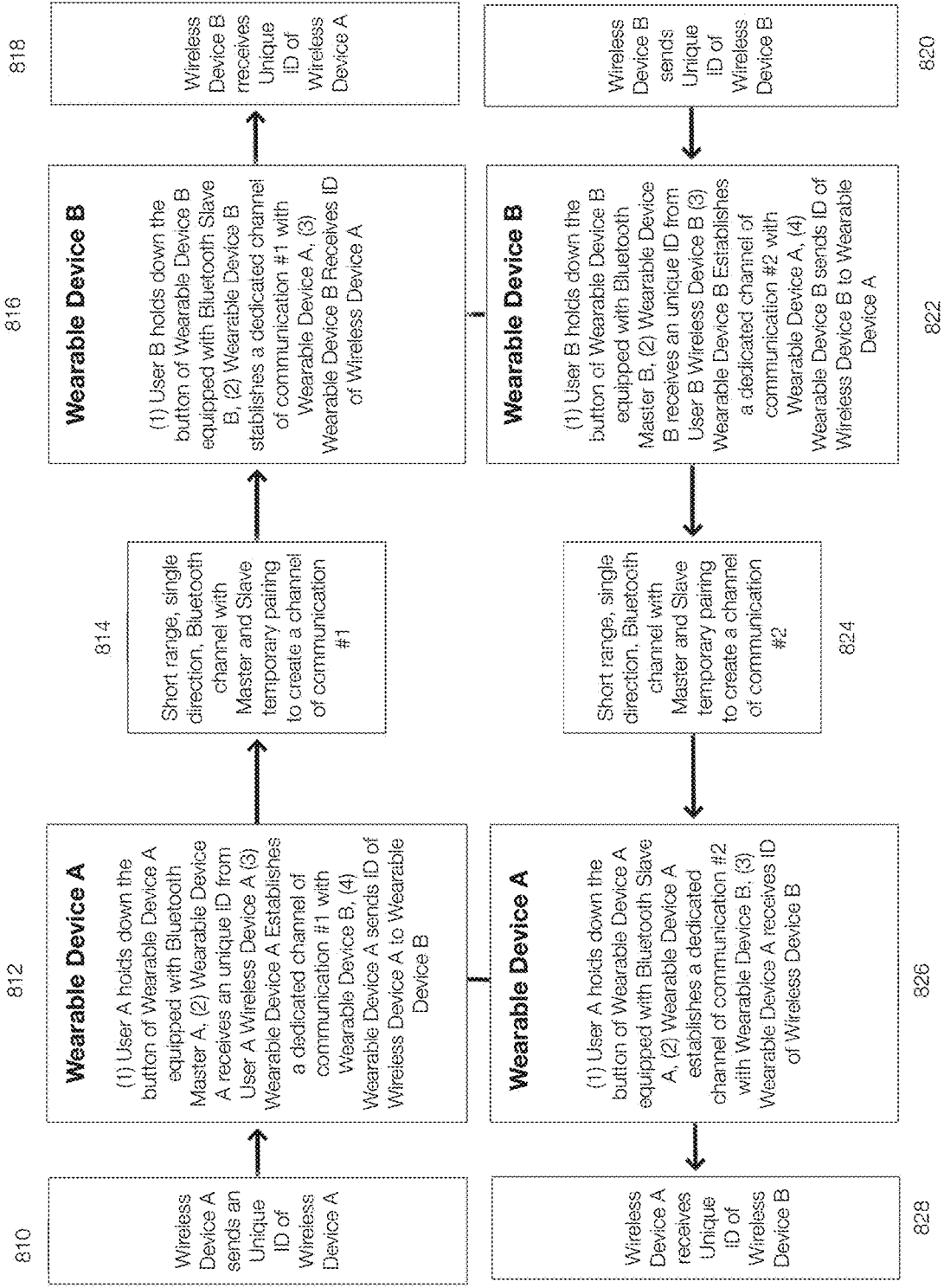

DEVICES FOR SINGLE ACTION, AUTOMATED PERSONAL EVENT REGISTRATION AND INFORMATION DISPLAY, PERSONAL

CROSS REFERENCE TO RELATED APPLICATIONS

This application is a continuation-in-part application of U.S. Nonprovisional patent application Ser. No. 15/838,462 filed Dec. 12, 2017, which is hereby incorporated by reference in its entirety.

FIELD OF THE INVENTION

The present invention relates to wearable devices and systems for event registration, personal information display and exchange, and local merchant advertising.

BACKGROUND OF THE INVENTION

Pre-planned events can involve multiple time-consuming steps for both event organizers and event attendees. In particular, business networking events, meetings and conferences can require the repetitive collection of attendee personal information along with printing and issuing name tags, leading to an inefficiently run and chaotic event. Conversations can be difficult to initiate with other attendees without knowing each other's common interests. The exchange of business cards does not lead to easy digital storage and retrieval of personal contact information. Event attendees are also exposed to irrelevant advertising which is not associated with their personal interests.

Therefore, there is a need for a system of event registration, wearable devices and advertising.

BRIEF SUMMARY OF THE INVENTION

In some aspects, the present invention provides an event management system that facilitates the event planning and registration stages, provides linked wearable devices to enhance the event experience of attendees and dynamic advertising within the system.

Event attendance can require pre-registration, event day admission by verifying attendee registration information, and the issuance of a name tag showing the event attendee's name and affiliation digitally and automatically without human intervention. During an event, an attendee may engage conversations with other attendees and then exchange contact information by swapping business cards. The event attendance and exchange of contact information processes can create challenges for both attendees and event organizers.

For an attendee to register for an event, he or she has to enter their personal contact information, such as name, employer, email, phone number and address for each event. This is repetitive and inefficient. When attending an event, having an enjoyable conversation with another attendee for the first time can be hard, as a typical name tag shows only the name and employer. The name tag gives limited clues about the other person on conversation starters. At events, attendees may also collect business cards, but these business cards may just stay in a box or biz card folder following the event. The event attendees may find it time consuming to enter contact information into a digital contact database to use later.

For event organizers, tracking and verifying registration information, admitting attendees, printing name tags and matching attendees to name tags can be time consuming, chaotic, inefficient, and expensive due to limited event resources at the day of the event.

For local merchants, advertising at events is typically canned and static in printed signs or on a big screen display. Custom tailoring advertising contents to attendees' interests on the fly and having highly visible multiple screen displays worn by individuals can help reach the desired audience and generate maximum brand awareness and impact. Individually wearable small screens that visibly display merchant advertising currently do not appear to exist.

Thus, there is a need for a system or method that enables an integrated and simpler event registration, personal information display and exchange, and merchant advertising devices and systems.

BRIEF DESCRIPTION OF THE SEVERAL VIEWS OF THE DRAWINGS

FIG. 9 is a flow chart of a wearable device initiated exchange of contact information among event attendees according to one embodiment.

FIG. 10 is a schematic of a wearable device initiated display of event attendee's personal information, interests, and merchant advertising, according to one embodiment.

FIG. 11 is an example of graphic display of user information, interests, and merchant advertising according to one embodiment.

FIG. 12 is a flow chart of the communication of information between two wearable devices for the initiation and exchange of personal contact information, according to one embodiment.

DETAILED DESCRIPTION OF THE INVENTION

Figure 1:
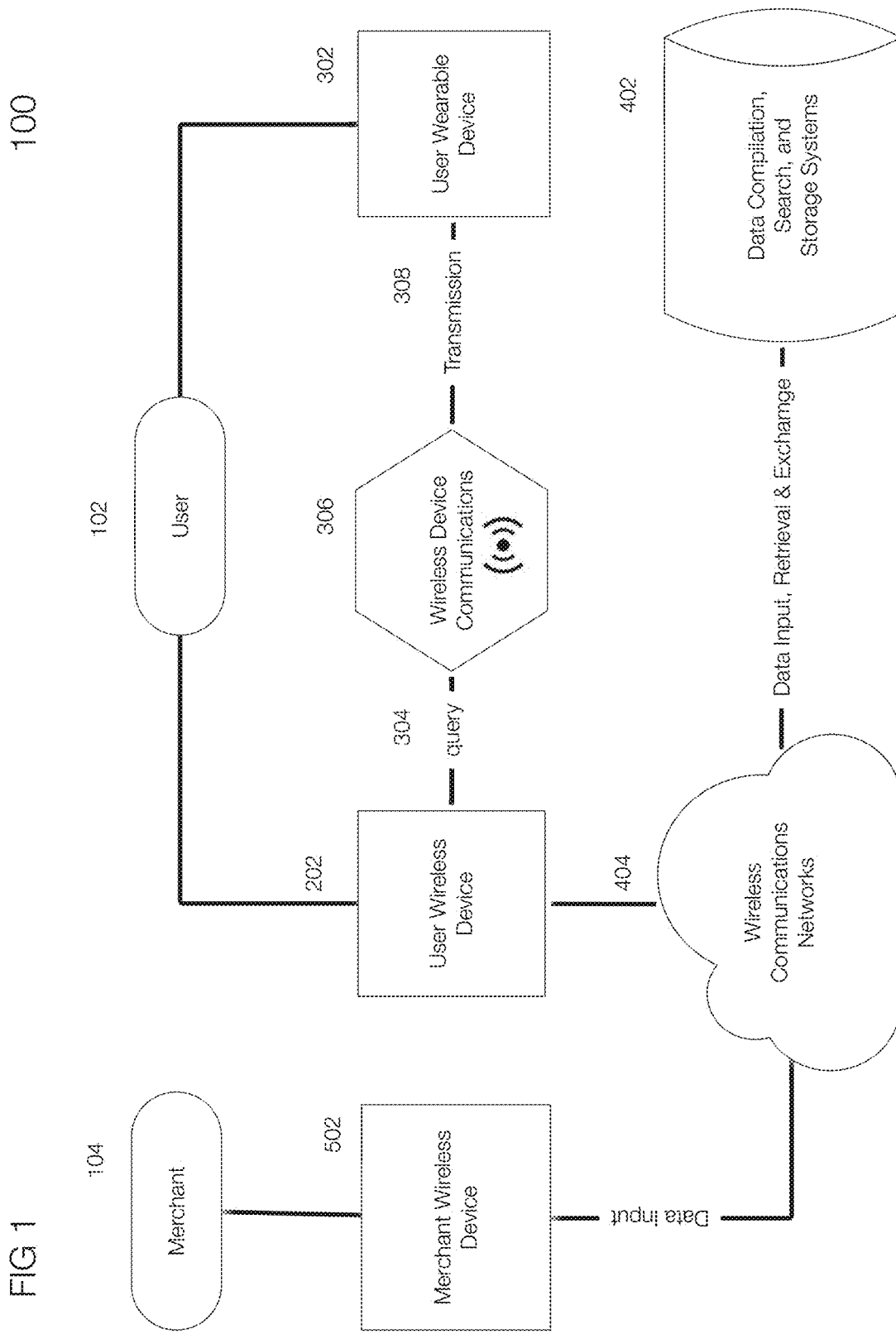
FIG. 1 is a block diagram of a Single Action networked systems and devices for event registration, personal information display and exchange among attendees, and local merchant information display according to one embodiment.

In FIG. 1 is a block diagram of a Single Action networked systems and devices 100 for event registration, personal information display and exchange among attendees, and local merchant information display according to one embodiment. The networked systems and devices 100 may be comprised of or implement a plurality of servers and databases and/or wireless devices, and/or wearable devices, and/or software components that operate for various event registration, personal and merchant information display, and exchange of personal information. The networked systems and devices 100 may be deployed in other ways and the operations performed and/or the services provided by such systems and services may be combined or separated for a given implementation and maybe performed by a greater number or fewer number of wireless devices, wearable devices, and servers and databases.

Exemplary user wireless devices 202 may include, but are not limited to, iOS or Android powered mobile phones, tablet devices, and computers. Exemplary user wearable devices 302 may include, but are not limited to, Bluetooth®, Wi-Fi, or near field communication (hereinafter "NFC") pared wearable devices with digital displays, sensors, and data storage. Exemplary Data Compilation, Search, & Storage Systems 402 may include, but are not limited to, stand alone or cloud based servers, and databases, such as Amazon Cloud Services.

User 102 may use a user wireless device 202 to send user 102 personal information, such as name, company, mobile phone number, and email, and personal interests to be stored at a Data Compilation, Search, and Storage Systems 402 through wireless communications networks 404. A merchant 104 may use a merchant wireless device 502 to send merchant 104 information, such as merchant contact name, merchant name, mobile phone number, email, and special offer details, to be stored at Data Compilation, Search, and Storage Systems 402 through wireless communications networks 404. User 102 may also use a user wireless device 202 to retrieve user 102 personal information and merchant information from the Data Compilation, Search, and Storage Systems 402 through the wireless communications networks 404.

User wireless device 202 may be implemented using appropriate hardware and software configured for wireless communication over wireless communications networks 404. For example, in one embodiment, the user wireless device may be implemented as a smart phone or other computing and communication devices capable of transmitting and receiving data, such as an iPad or iPhone. In some embodiments, the user device 202 may include a user interface, such as a mobile software application. A mobile software application may be implemented and configured to view event information and contact information, create events, input personal and merchant information, and exchange user information.

The Data Compilation, Search, and Storage Systems 402 may include data compilation, search engines, data files, storage servers, memories, processors, drivers, application programming interfaces (hereinafter "API"), authentication and validation modules, time and location synchronization engines.

In some embodiments, the user 102 can wear a user wearable device 302 which is readily and easily visible to others. The user wearable device 302, can be paired to the user wireless device 202 over wireless device communications 306, which can include but is not limited to Wi-Fi, Bluetooth®, or NFC. The user wearable device 302 communicates with user wireless device 202 by sending out queries 304 for information and by receiving information 308 from the user wireless device 202 and vice versa. The wearable device 302 may include one or more processors, memories, and other appropriate components for communicating with the user wireless device 202. The user wireless device 202, upon receiving a query 304, transmits 308 user and merchant information cached on the user wireless device 202 to the user wearable device 302. The user and merchant information are previously received and cached on the user wireless device 202 from the Data Compilation, Search, and Storage Systems 402. The user wireless device 202, upon receiving query and command 304 from the user wearable device 302, may relay such query and command 304 information to the Data Compilation, Search, and Storage Systems 402.

The wireless communications networks 404 may include, but is not limited to, the Internet, one or more intranet landline networks, wireless networks and/or other appropriate types of networks. The wireless communications networks 404 may also include a local area network (LAN) interface in some embodiments. The LAN interface may represent an interface to a wired Ethernet-based network, but may also represent an interface to a wireless LAN, such as an IEEE802.11x wireless network.

Upon receiving a query and command 304 from the user wireless device 202, the Data Compilation, Search and Storage Systems 402 may then perform data searches and calculations and generate new values and new data fields for existing or new data files. Such new data fields may allow the user 102 to gain new access to certain data files and fields previously authorized, such as when attendees swap their contact information.

Figure 2:
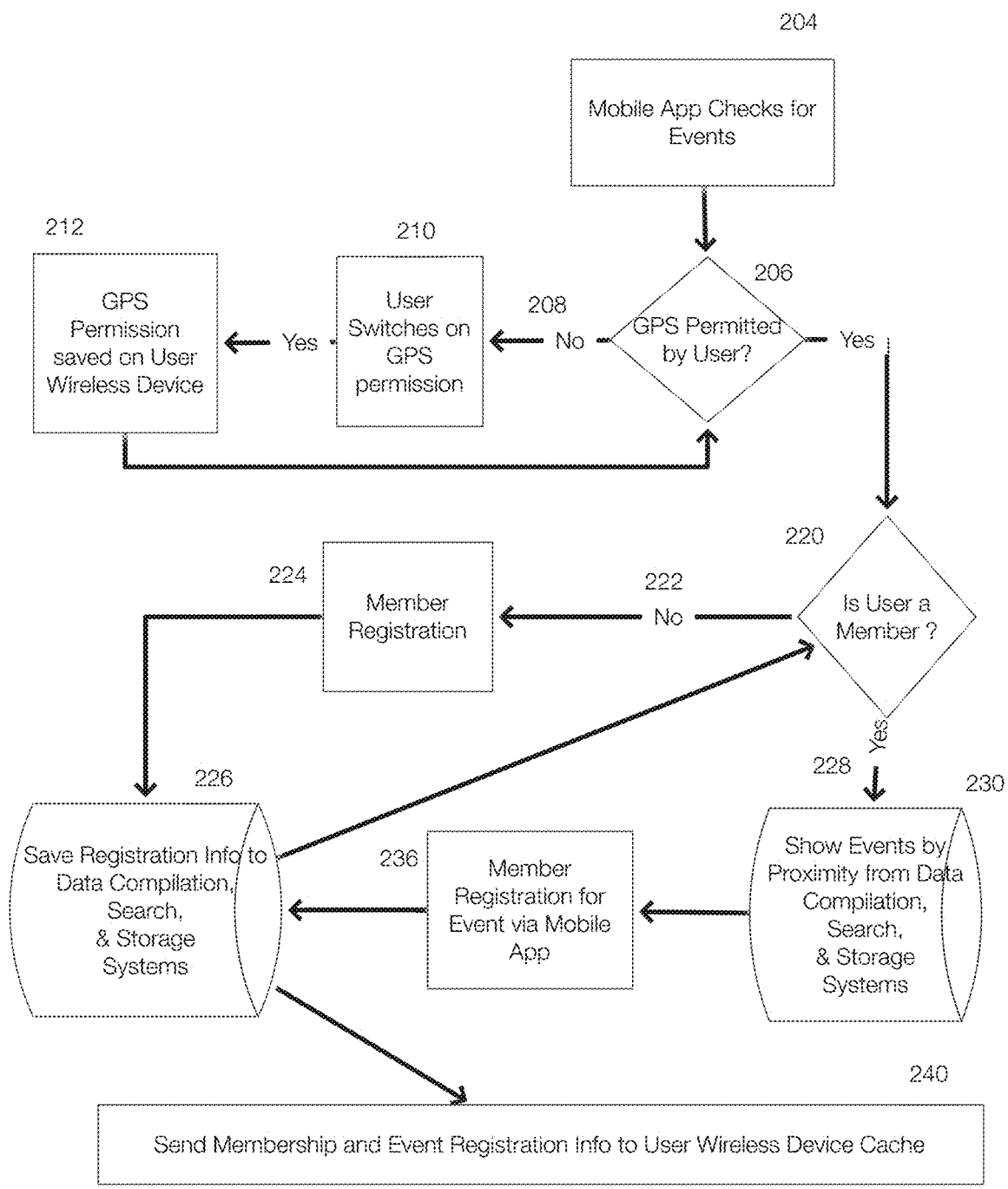
FIG. 2 is a flow chart of an event attendee's personal information capture and storage through a mobile device when registering for an event according to one embodiment.

In FIG. 2 is an exemplary flow chart of an event attendee's personal information capture and storage through a mobile device when registering for an event 200-1 according to one embodiment. FIG. 2 illustrates one of a plurality of instances concerning the initial creation and capture of user personal information. The process of FIG. 2 may be deployed in other ways and the operations performed and/or the services provided by such systems and services may be combined or separated for a given implementation and maybe performed by a greater number or fewer number of steps and processes.

A user 102 may use a user wireless device 202 to direct a mobile application to check for events 204, optionally by organization or club. Such an organization or club may be organized on an exclusive or non-exclusive basis. In some embodiments, the mobile application check for events 204 may show activities or events organized by proximity of time and location. To search by location, the mobile application then queries whether GPS has been permitted by the user 206. If GPS has not been enabled 208, the user must switch on the GPS permission 210 to receive location based results. The GPS permission is saved on the user wireless device 212 and the mobile application can reconfirm that GPS is permitted by the user 102.

Once GPS has been permitted by the user, the mobile app then determines whether the user is a member 220. If the user is not a member 222, the individual is required to register 224 as a member. The user's registration information is saved to the Data Compilation, Search & Storage Systems 226 and the mobile application can reconfirm that the user is a member 220. The Data Compilation, Search, & Storage Systems 402 may then send 240 user 102 information to the cache 242 of the user wireless device 204.

If GPS was permitted by the member in step 206 and the user is a member 228, the mobile application may query 230 the Data Compilation, Search, & Storage Systems 402 for activities and events by proximity and transmit the data to the user wireless device 202. The Data Compilation, Search, & Storage Systems 402 may then search through its data files and retrieve activities and events by proximity to the user wireless device 202 and show such information to the user on the screen of the user wireless device 202.

In some embodiments, the user 102 may then register 236 automatically for the chosen activity or event by a single action through the mobile application for all future events. Such a single action may also allow the immediate display of the user's 102 personal information, such as name, employer, interests, and nearby merchant establishments on the user wearable device 302.

Figure 3:
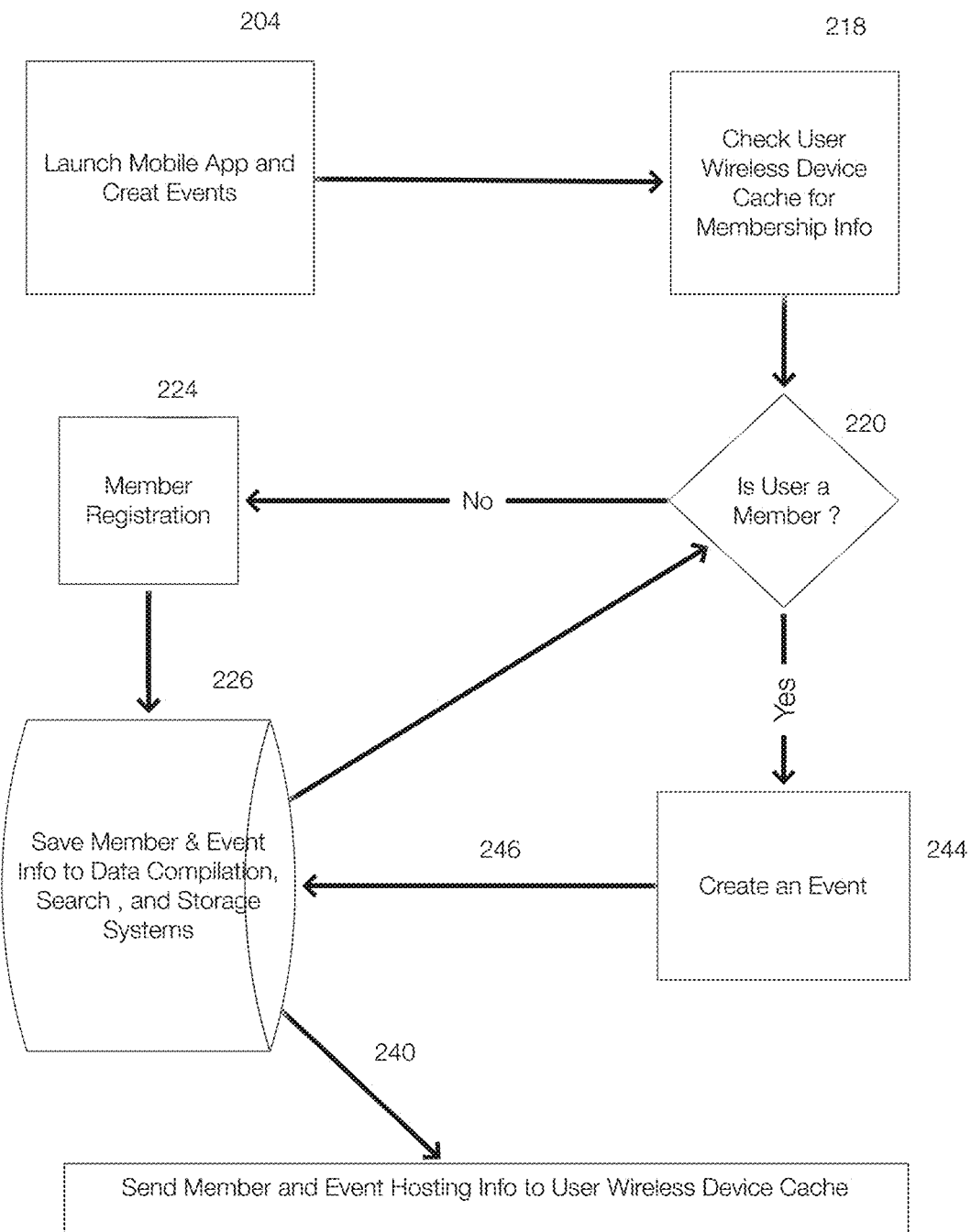
FIG. 3 is a flow chart of an event attendee's personal information capture and storage through a mobile device when organizing an event for the first time according to one embodiment.

In FIG. 3 is a flow chart of an event attendee's personal information capture and storage through a mobile device when organizing an event for the first time according to one embodiment. FIG. 3 illustrates one example of plurality of instances regarding user information capturing and storage during the first use the mobile application and all subsequent automatic applications of such information for future engagements. FIG. 3 may be deployed in other ways and the operations performed and/or the services provided by such systems and services may be combined or separated for a given implementation and maybe performed by a greater number or fewer number of steps and processes.

A user 102 may use a user wireless device 202 to access a mobile application relating to an organization or club. Such an organization or club may be organized on an exclusive or non-exclusive basis. A user first launches the mobile application to create an event 204. The mobile application first queries the user wireless device cache for the user's membership information 218 and then determines if the user 102 is a member 220. If the wireless device cache 242 does not show membership information, the mobile application requires the user 102 to register for the organization or club membership 224 by providing personal information, such as a user 102 name, company, email, and mobile phone number. The mobile application then saves 226 member information to the Data Compilation, Search, & Storage Systems 402. The Data Compilation, Search, & Storage Systems 402 may then send 240 user 102 membership information to the wireless device cache 242 of the user wireless device 202. If the wireless device cache 242 shows that the user 102 is a member 220, the user 102 may then use mobile application to create an event. The information related to an event, which may include name of organizer, topic, content, time and location, may then be saved 246 to Data Compilation, Search, and Storage Systems 402.

Figure 4:
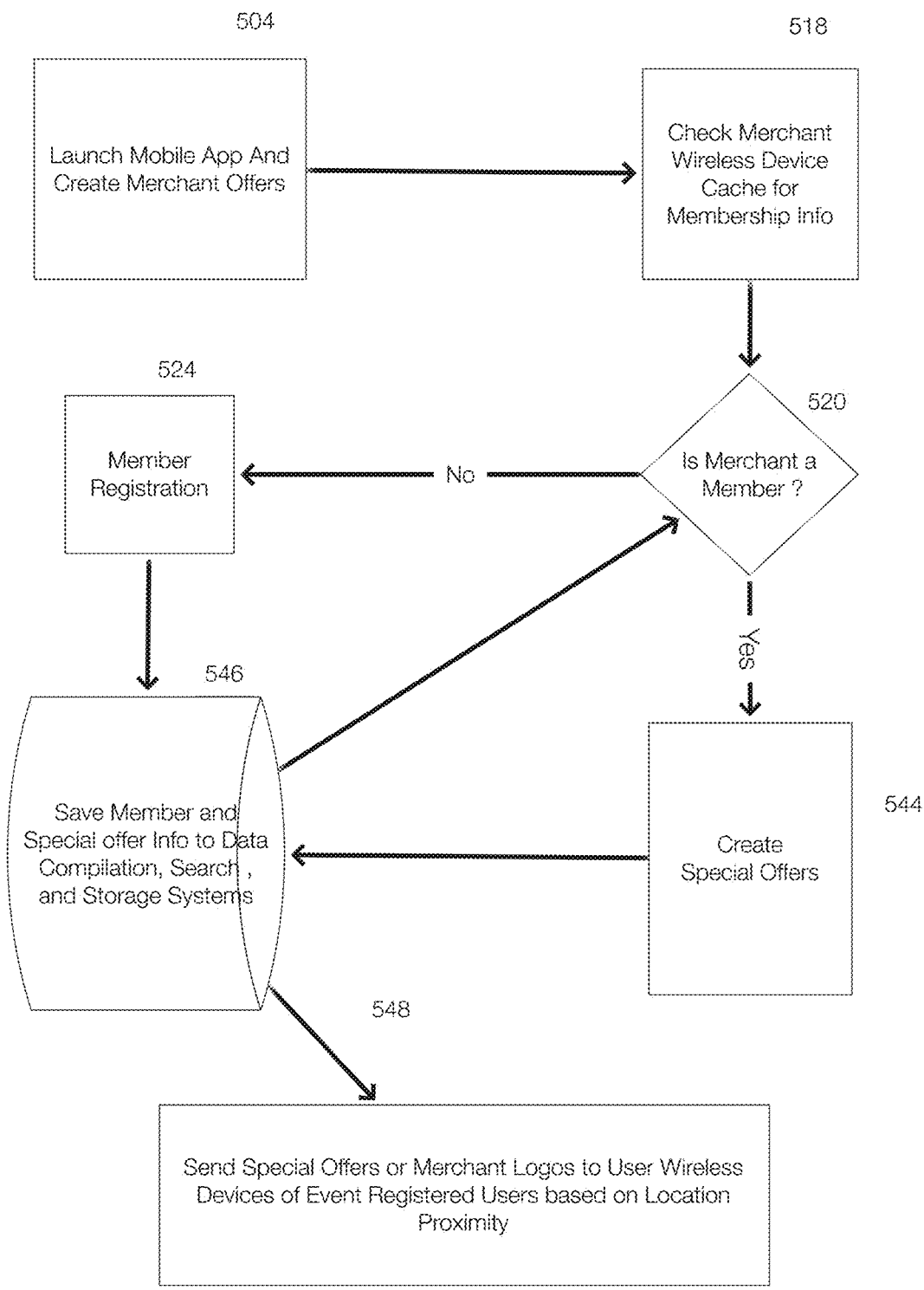
FIG. 4 is a flow chart of a merchant information capture and storage through a mobile device when making a special offer for the first time according to one embodiment.

In FIG. 4 is a flow chart of a merchant information capture and storage through a mobile device when making a special offer for the first time according to one embodiment. FIG. 4 illustrates how a merchant may register for product and service for advertising purposes. FIG. 4 may be deployed in other ways and the operations performed and/or the services provided by such systems and services may be combined or separated for a given implementation and maybe performed by a greater number or fewer number of steps and processes.

The merchant 104 may use a merchant wireless device 502 to access a mobile application. The merchant 104 first launches the mobile application to create merchant offers 504. The mobile application first queries the merchant wireless device cache for the merchant's 104 membership information 518. The mobile application then confirms whether the merchant 104 is a member 520.

If the merchant 104 is not a member, the mobile application directs the merchant 104 to register 524 by providing their information, such as the merchant 104 contact information, merchant name, email, and mobile phone number. The mobile application then saves 546 the merchant information to the Data Compilation, Search, and Storage Systems 402.

If the merchant 104 is a member, the merchant 104 may then use the mobile application to create a special offer 544. The information contained in the special offer, which may include the merchant name, special offer, time and location, may then be saved 546 to the Data Compilation, Search, and Storage Systems 402. The merchant advertising information may then be sent 548 to the user wireless device cache 242 and/or the merchant wireless device cache 542.

Figure 5:
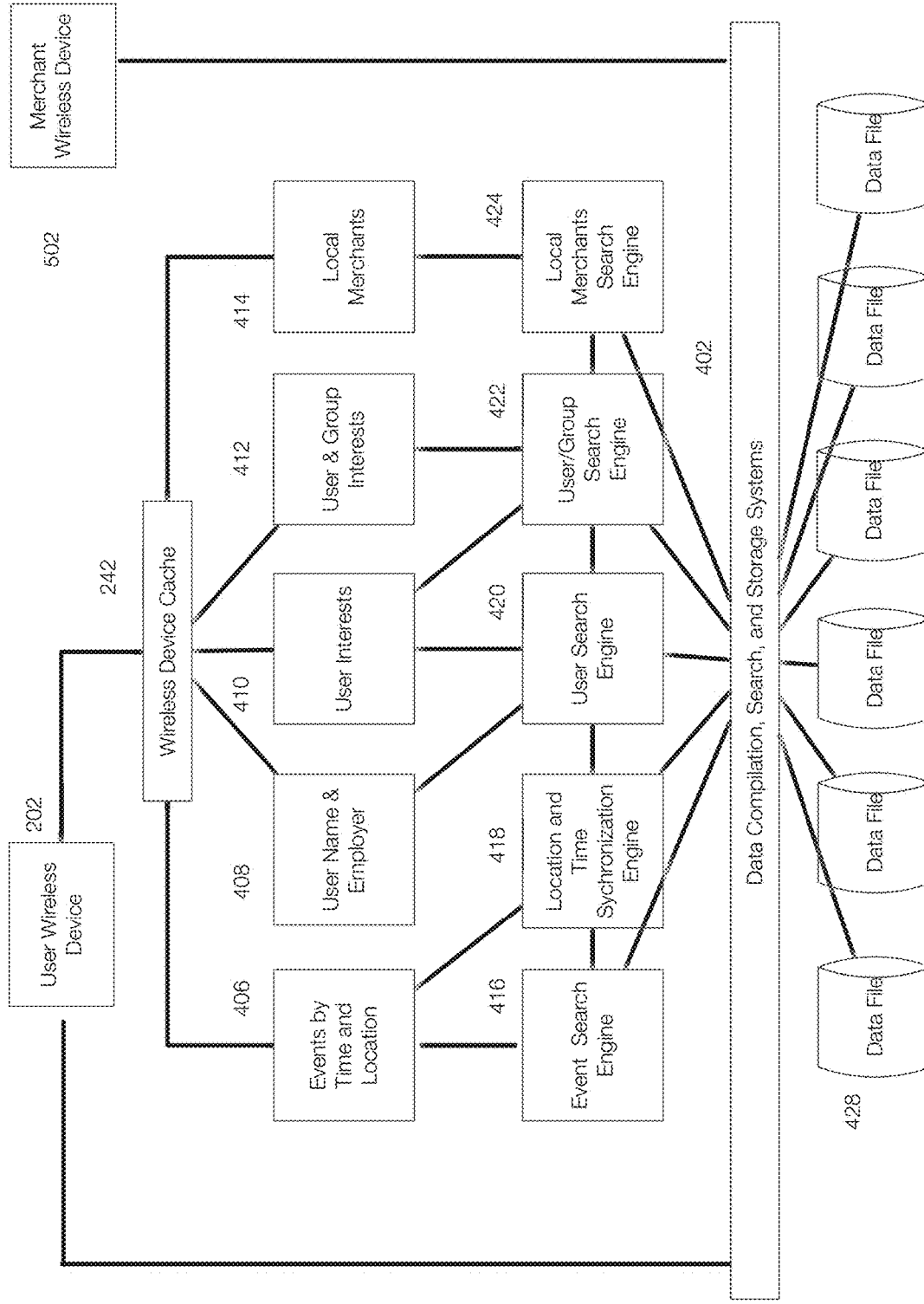
FIG. 5 is a schematic of data systems that store and manage information on users, events, and merchant offers according to one embodiment.

In FIG. 5 is a schematic of data systems that store and manage information on users, events, and merchant offers according to one embodiment. FIG. 5 provides an example of database functions and algorithm for generating user and merchant information for application including the user wearable device 302 display. FIG. 5 may be deployed in other ways and the operations performed and/or the services provided by such systems and services may be combined or separated for a given implementation and maybe performed by a greater number or fewer number of steps, processes, data files, algorithms, devices, and software components.

The user wireless device 202 may serve as a primary means for the user 102 to input and retrieve personal information, such as name & company 408, email, mobile, and interests 410 into the Data Compilation, Search, and Storage Systems 402. The merchant wireless device 502 may serve as a primary means for the merchant 204 to input merchant information, such as contact at merchant, merchant name, contact methods, and special offers into the Data Compilation, Search, and Storage Systems 402.

The Data Compilation, Search, and Storage Systems 402 stores user 102 generated information and merchant 104 generated information in a plurality of data files 428. The data files 428 may maintain, for example, one or more distinct data files on the user's 102 basic membership information, such as name, company, email, and mobile phone number. Other distinct data files may include the user's 102 personal interests, such as sports, music, hobby, restaurants, travel, etc. Another distinct data file may include, for example, the user's 102 organized events with information about the date, location, title, content of the event.

The data files 428 may maintain, for example, one or more distinct data files on the merchant's 104 merchant registration information, such as merchant contact information, merchant name, address, nature of business. Other data files, may include, for example, the merchant's 104 special offers with information about the location, time, products and services, logo, and/or special offers.

The data files 428 may include specific contact information which can be exchanged digitally as illustrated by FIG. 9. The Data Compilation, Search, & Storage Systems 402 may include a plurality of data search engines 416, 418, 420, 422, 424 & 432 with specialized data computation, mining, manipulation logic and algorithm applications.

In some embodiments, the Data Compilation, Search & Storage Systems 402 may use a location and time synchronization engine 418 and user search engine 420 to evaluate and filter all registered event attendees. The location and time synchronization engine 418 and event search engine 416 may then evaluate and filter all organized events. The location and time synchronization engine 418 may then match up the two groups of data to validate registered attendees.

Upon matching two sets of data from data files, the above-mentioned search engines may then generate on the user wireless device's 202 display events by time and location 406 and provide the user's 102 name and company to the user wireless device cache 242 for subsequent user wireless device display or transmission to the user wearable device 302 display.

In some embodiments, such computation may also use the location and time synchronization engine 418 and local merchant search engine 424 to evaluate and filter all event registered attendees and events by location and time using the data in, for example, user, event, and merchant data files 428. Such search and computation may generate data set matches, which may then be outputted to the wireless device cache 242, for subsequent user wireless device transmission to the user wearable device 302 display.

In some embodiments, such computation may also use user search engine 420 and user/group search engine 422 to analyze data on individual user interests and the overall group interests. The analytical logic may rank, rate, and present the user interests in order, relevance, and importance to the aggregate group interests. The resulting rankings may then be summarized and streamlined in the form of data points presented in the form of user interests 410 or user & group interests 412. Such information may be output to the user wireless device 202 and to the user wireless cache 242 for subsequent user wireless device 202 display or transmission to the user wearable device 302 display.

In some embodiments, the location and time synchronization engine 418, at the request of the user 102, may facilitate exchange of the user's 102 contact information by allowing another user to access the user's 102 one or more distinct date files including basic contact information. Such database functions may be performed independently in the background, or when prompted by the user wireless device 202.

The following is a list of exemplary descriptions for the blocks contained in FIG. 5. While the following descriptions are used in some embodiments, it is appreciated that these definitions could be changed by a person skilled in the art, within the inventive concept expressed herein. Events by Time and Location 406 can represent events that a member has registered or RSVPed. The Events by Time and Location 406 information can be readily available to the member and can serve as a reminder on a user wireless device. User Name and Employer 408 can be used as a confirmation of registration and personal information display for a wearable wireless device. User Interests 410 can be the interests registered by users into a personal profile for display on a wearable wireless device. User Interests 410 can be arranged to match the most shared group interests for a particular event. User & Group Interests 412 can represent the collective interests of the attendees for any one particular event. The User & Group Interests 412 can be displayed by the order of popularity. Local Merchants 414 can represent commercial establishments, such as retail shops, restaurants, cafes, fitness clubs, coffee shops, galleries, hair salons, museums, movie theatres, and any consumer facing store fronts within a specific distance, say for example, a 1 mile radius of the event the location. The Event Search Engine 416 can be a part of an API that searches Data Compilation and Storage Systems for events that will take place over a specific period of time within the immediate future, such as 5 hours. The Event Search Engine 416 can automatically update the listing of events as time elapses. The Location and Time Synchronization Engine 418 can act as two algorithmic ordering systems that sort and list events according to closest locations and times to the user. The Location and Time Synchronization Engine 418 can be a dynamic engine that automatically updates and lists events within a pre-determined distance, such as 20 miles, and pre-determined time, such as 5 hours, in relation to the user. The User Search Engine 420 can be configured to retrieve a particular user's profile information, such as name, employer, contact, and interests from Data Compilation, Search, and Storage Systems. The User/Group Search Engine 422 can be configured to compile, tabulate, and calculate the common shared interests or characteristics of the group of event attendees for a particular event. Based on such a computation, the User/Group Search Engine 422 may draw aggregate inferences for use by a Local Merchant. The Local Merchants Search Engine 424 can be configured to represent the search capability of the Data Compilation, Search and Storage Systems to locate Local Merchants within a specific distance of a particular event, say for example, a 1 mile radius of a particular event. The Local Merchants Search Engine 424 can also be configured to determine the matching Local Merchants' advertising interests with the event attendees' interests and render appropriate advertising content. The Local Merchants Search Engine 424 can also be configured to facilitate a market auction process for Local Merchants to bid and pay for the limited advertising space by designated time slots. The Data Files 428 can represent the data record files, each with either common data fields or unique data fields, for easy data management and security. The Data Files 428 can allow for faster and easier data retrieval, tabulation, computation, combination, mining, and artificial intelligence and machine learning, and recommendations for users and merchants.

Figure 6:
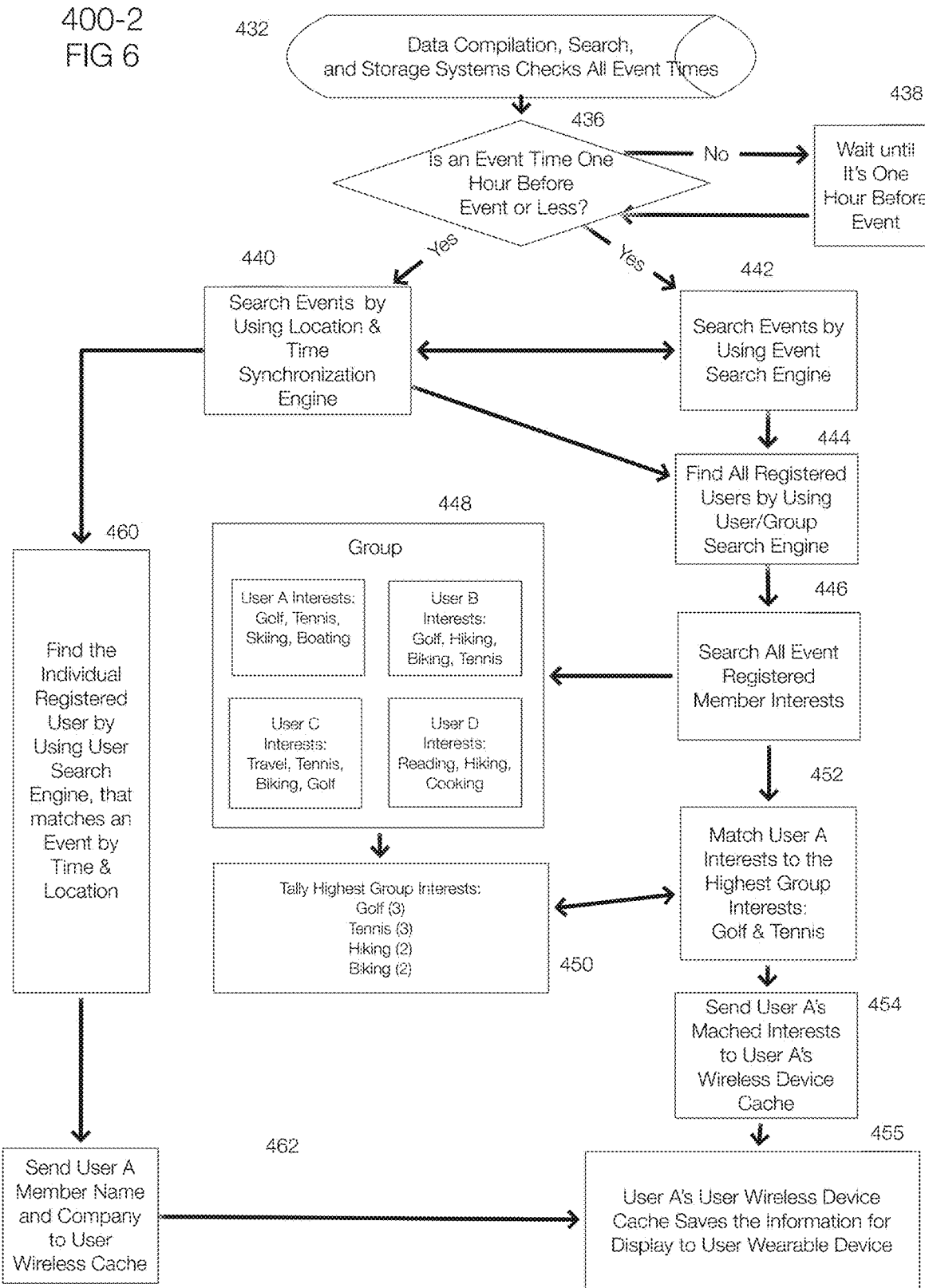
FIG. 6 is a flow chart of event cache of personal information, personal interests best matched to group interests according to one embodiment.

FIG. 6 is a flow chart of event cache of personal information, personal interests best matched to group interests 400-2 according to one embodiment. FIG. 6 shows one embodiment of how the Data Compilation, Search, and Storage Systems 402 works. FIG. 6 may be deployed in other ways and the operations performed and/or the services provided by such systems and services may be combined or separated for a given implementation and maybe performed by a greater number or fewer number of steps, processes, data files, algorithms, devices, and software components.

The Data Compilation, Search, and Storage Systems may initiate a computation process one hour, for example, before the start of an event 432. The timing of the computation process can be preselected by multiple parties, including but not limited to, the user, merchant and/or the mobile application and can be set for a number of values based on multiple reference points. The Data Compilation, Search, & Storage Systems initially checks all event times 432. The Data Compilation, Search, & Storage Systems then determines whether the present time is one hour or less before an event 436. If the present time is not one hour or less prior to the beginning of an event, the Data Compilation, Search, & Storage Systems waits until the present time is one hour prior to the beginning of an event 438.

In some embodiments, the location and time synchronization engine 418 and event search engine 416, as components of the Data Compilation, Search and Storage Systems 402, may scan 440 the data files 428 for events that may take place one hour from the start of the computation process. The event search engine 416 can then search the data files 428 for the locations of these events 442. The location and time synchronization engine 418 can also scan the data files 428 for registered members 440 that match the particular event with a particular time and location. After a match may have been found, the registered member name and company name can be sent 462 to user wireless device cache 242.

The user/group search engine 422 can scan the data files 428 for the registered members 444 and scan the personal interests 446, such as golf, skiing, painting, movies, etc., of the registered members and compile a listing of personal interests 448. The user/group search engine 422 may tally all the event registered members' interests, rank them by popularity, and list the most popular interests first 450. The user search engine 420 may also search each individual event registered member's interests and generate the top matches to the group interests 450. A user's interests can then be matched to the highest group interests 452 and then send 454 to that user's wireless device cache 242. Once sent to a user's wireless device cache 242, the data can be saved 455 for display on the user wearable device.

Figure 7:
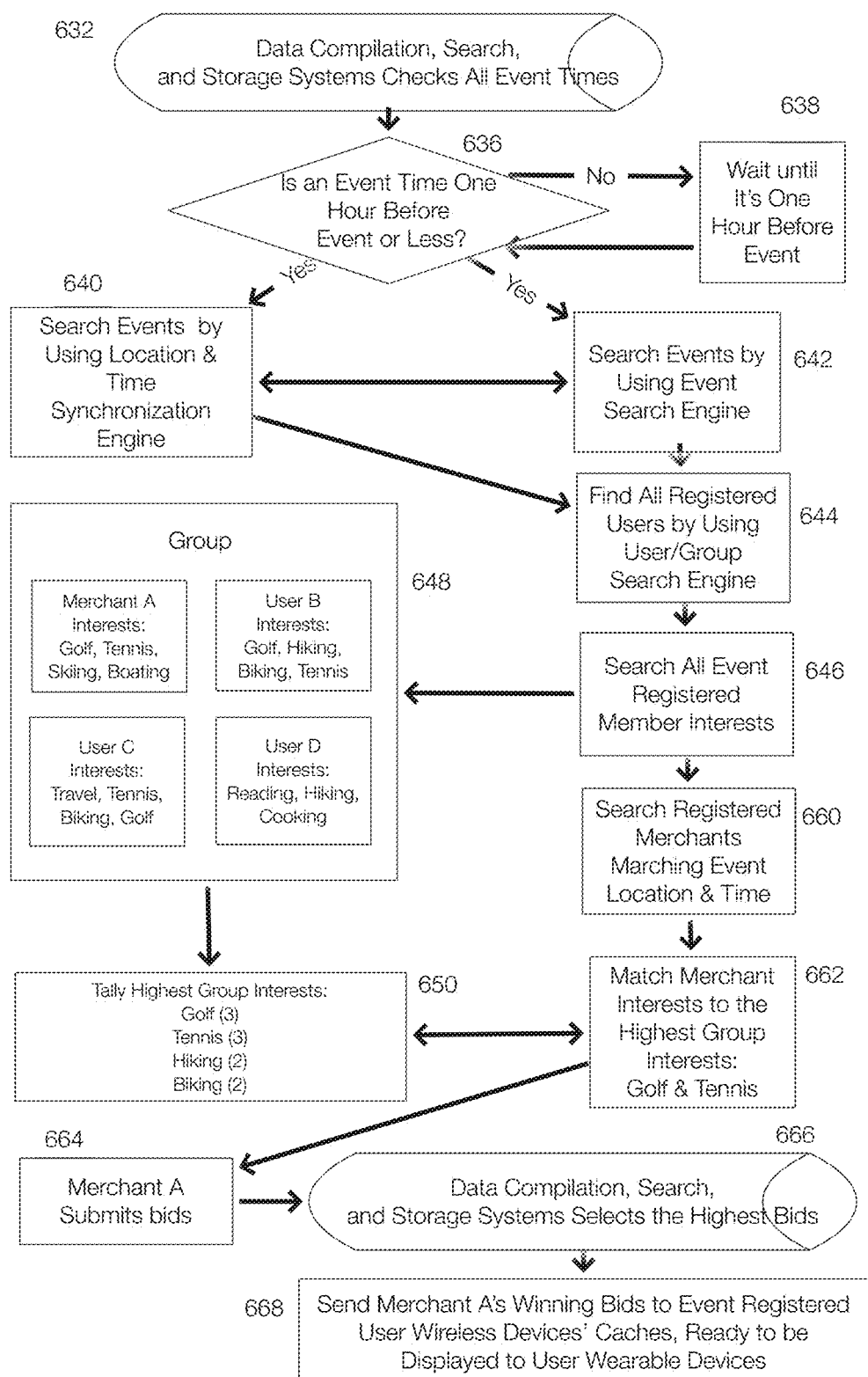
FIG. 7 is a flow chart of event cache of personal information, personal interests best matched to local merchant advertising according to one embodiment.

FIG. 7 is a flow chart of event cache of local merchant advertising best matched to personal information and personal interests according to one embodiment. FIG. 7 may be deployed in other ways and the operations performed and/or the services provided by such systems, components, and services may be combined or separated for a given implementation and maybe performed by a greater number or fewer number of steps, processes, and components.

The Data Compilation, Search, and Storage Systems may initiate a computation process one hour, for example, before the start of an event 632. The timing of the computation process can be preselected by multiple parties, including but not limited to, the user, merchant and/or the mobile application and can be set for a number of values based on multiple reference points. The Data Compilation, Search, & Storage Systems initially checks all event times 632. The Data Compilation, Search, & Storage Systems then determines whether the present time is one hour or less before an event 636. If the present time is not one hour or less prior to the beginning of an event, the Data Compilation, Search, & Storage Systems waits until the present time is one hour prior to the beginning of an event 638.

In some embodiments, the location and time synchronization engine 418 and event search engine 416, as components of the Data Compilation, Search and Storage Systems 402, may scan 640 the data files 428 for events that may take place one hour from the start of the computation process. The event search engine 416 can then search the data files 428 for the locations of these events 642. The location & time synchronization engine 418 can also scan the data files 428 for registered members that match the particular event with a particular time and location 640.

The user/group search engine 422 can scan the data files 428 for the registered members 644 and scan the personal interests 646, such as golf, skiing, painting, movies, etc., of the registered members and compile a listing of personal interests 648. The user/group search engine 422 may tally all the event registered members' interests, rank them by popularity, and list the most popular interests first 650. The user search engine 420 may also search each individual event registered merchant interests and generate the top matches to the group interests 650.

The Data Compilation, Search, & Storage Systems 402 can search for registered merchants matching the event location and time 460. The highest group interests determined in step 650 can be matched to the merchants 662. A merchant can be matched to the highest group interests through multiple methods, including but not limited to, keyword matching (e.g., if a highest group interest is golf, a golf equipment store could be a matched merchant since both categories include "golf" as a common term), categorizing all group interests and merchant types for later matching (e.g., golf could be characterized as a sport and a golf equipment store could be categorized as a sports type merchant), or a merchant could manually enter categories of group interests that it seeks to target for advertising. Once merchants are matched to a group's interests, merchants can submit bids to display advertising 664. The Data Compilation, Search, & Storage Systems 402 selects the highest merchant bids 666 and sends advertising material for the highest merchant bids to the user wireless device caches 668.

The local merchant search engine 424 may also scan Data Files for locally registered merchants that match the event with a particular location and time. Local merchants may place bids on having their local and special offers displayed on User Wearable Device 302. Local Merchant Search Engine 424 may scan for the top highest bids for logo or special offers display. The top bids may then be sent 668 to User Wireless Device Cache 242.

Figure 8:
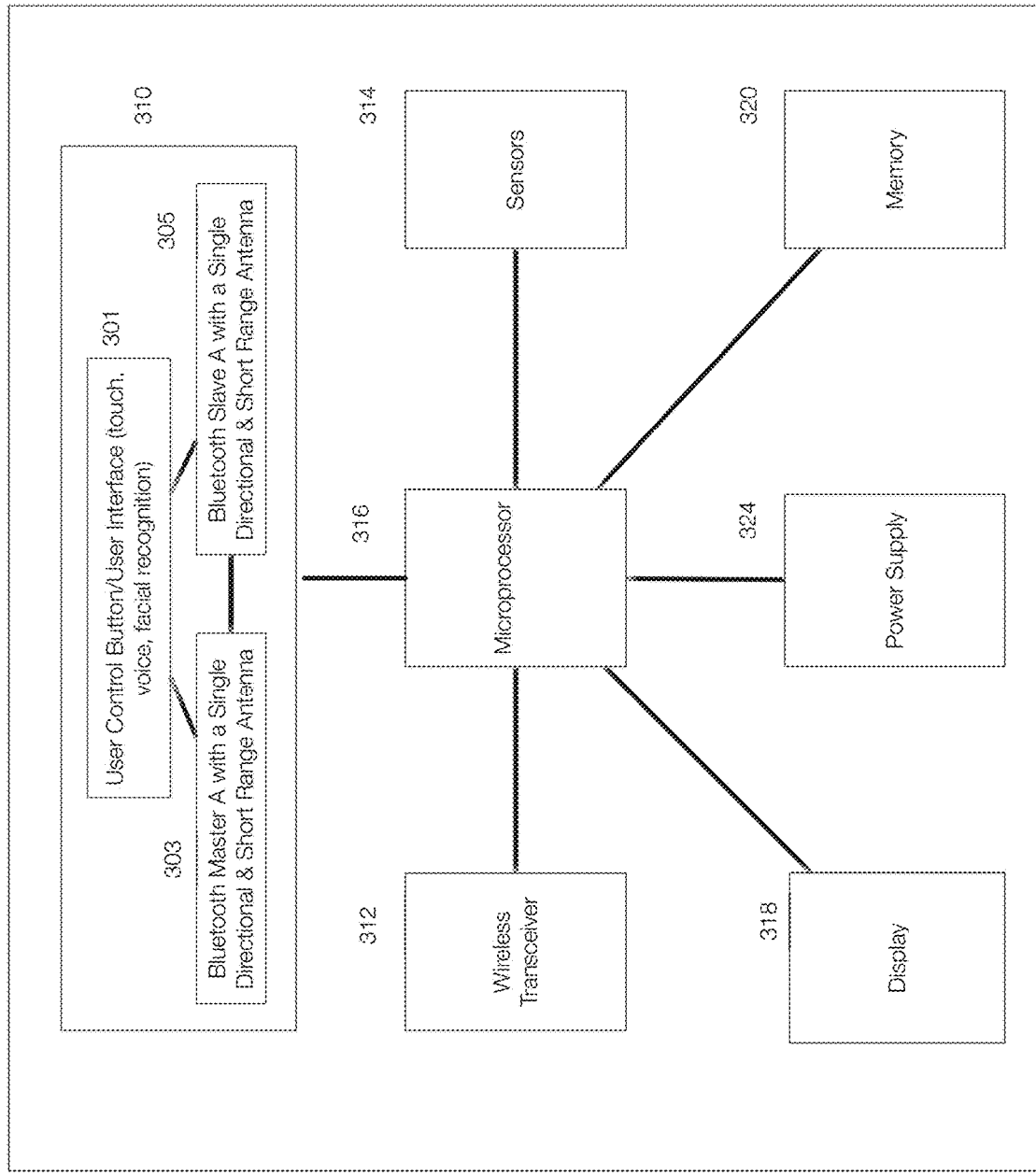
FIG. 8 is a block diagram of a wearable device for implementing event related registration, personal information and local merchant information display, and personal information exchange according to one embodiment.

FIG. 8 is a block diagram of a wearable device for implementing event related registration, personal information and local merchant information display, and personal information exchange according to one embodiment. FIG. 8 is one embodiment of a plurality of configurations of the user wearable device 302. FIG. 8 may be deployed in other ways and the operations performed and/or the services provided by such systems, components, and services may be combined or separated for a given implementation and maybe performed by a greater number or fewer number of steps, processes, and components.

In some embodiments, the user wireless device 302 may be configured with at least one user control interface 310, a wireless transceiver 312, sensors 314, a microprocessor 316, a display, 318, memory 320, and a power supply 324. Other embodiments may use some or all of these components and may also include additional components. The user control interface 310 may allow, for example, the user 102 to perform one or more functions with a single input. The input switch 301 to the user control interface 310 can be a physical push-button switch in some embodiments. In some embodiments, the input switch 301 and/or the user control interface 310 can be a user wireless device or a smart phone configured to perform functions including one similar to that of a physical button.

In embodiments where the input switch 301 is a physical push-button switch, its depression may allow the user 102 to perform one or more functions with a single input. In some embodiments, the user control interface 310 is responsive to commands transmitted via voice, touch, a bodily movement or facial recognition and received by an appropriate embodiment of the input switch 301 configured to receive such a command. An input to the input switch 301 could initiate a change or rotation in the display of the user's 102 individual information, such as name, company and personal interests, and merchant names, logos and/or special offers. The input switch 301 may also allow, as another example, a multitude of users, to perform time synchronized functions, such as the exchange of contact information, by using the input switch 301 on multiple user wireless devices 302 at the same time to send a command to their respective user control interface 310.

The user control interface 310 may represent indicator lights and user input structures, but may also include an input switch 301 on the display 318. The input switch 301 may include voice, touch, movement and/or facial recognition in addition to a physical push-button switch or as a substitute for a physical button. The input switch 301, may also synchronize with the wireless transceiver 312 to send a query to, and receive information from another user wireless device 202. The wireless transceiver 312 may enable communication with the user wireless device 202 for the retrieval of information to display on the display 318. The wireless transceiver 312 may include an RF communication protocol, such as Bluetooth®, NFC or Wi-Fi.

The user control interface 310 may also be coupled to a Bluetooth® Master A with a single directional short-range antenna 303. The user control interface 310 and Bluetooth® Master A 303 may also be coupled to a Bluetooth® Slave A with a single directional short-range antenna 305.

The antenna 303 may have a direction determined by the lobe of maximum electromagnetic waves or radiation as defined by azimuth angles and elevation angles. The beamwidth of the antenna 303 can be optimized based the radio frequencies deployed to generate an ideal aperture area that covers the average upper front of a human body. The area of the upper front of a human body captured by the antenna 303 shall cover the chest area of 95% humans with height between 4 feet 11 inches and 6 feet 4 inches and of 95% humans with a range of weight distributions for the aforementioned height distributions. The aperture area can be defined and optimized by two humans standing facing each other, each wearing a directional antenna. The two antenna aperture coverage areas can have the same beamwidths, generating overlapping coverage on two front facing human upper bodies.

The aperture area is preferably defined and optimized for two humans standing facing each other and wearing directional antennas, who are one foot apart. The gain of the antenna radiation strengths with losses is preferably determined and optimized by the distance between two individuals standing ten feet apart. Therefore, the directional antenna is preferably optimized for strengths and overlapping aperture coverage area for two humans standing between one to ten feet apart and facing each other.

The direction of the two directional antennas can further be aided by directional sensors 314 that capture the same aperture areas of the antennas. These sensors 314 can power indication lights on multiple user wearable devices 302 to indicate the proper alignment of the two antennas 303 for the exchange of information.

The sensors 314 may include position, presence, proximity, acoustic, and sound sensors, including infrared sensors. The sensors 314 may detect and measure the distance between and among user wearable devices 302. With a pre-determined or preselected threshold of distance requirement, coupled with the users' 102 actions, for example holding down the input switch 301 simultaneously, a particular function may be performed, such as an exchange of personal contact information, including name, company, phone number and email. In some embodiments, the user wearable device 302 may include one or more microprocessors 316. Suitable microprocessors include but are not limited to "general purpose" microprocessors, a combination of general and special purpose microprocessors, or ASICS.

The memory 320 may be communicably coupled to the microprocessor 316 to store and display data and executable code. The memory 320 may represent volatile memory such as RAM, but may also include nonvolatile memory such as read-only memory (ROM), or flash memory. The memory 320 can be useful in buffering or caching data related to operations of the microprocessor 316 and storing data associated with applications running on the user wearable device 302.

The display 318 may display images and data for the user wearable device 302. The display 318 may be any suitable display, including but not limited to, a liquid crystal display (LCD), a light emitting diode (LED) based display or an organic light emitting diode (OLED) based display. In some embodiments, the display 318 may function as a touch screen through which user 102 may interact with the user wearable device 302.

FIG. 9 is a flow chart 300-2 of a wearable device initiated exchange of contact information among event attendees according to one embodiment. FIG. 9 is an embodiment of a function of multitude of functions that the user wearable device may be capable of performing. More specifically, FIG. 9 demonstrates how the user wearable device 302 facilitates the exchange of user 102 contact information digitally via a single action. Such contact information can then be easily assessable through the user wireless device 202. FIG. 9 may be deployed in other ways and the operations performed and/or the services provided by such systems, components, devices, and services may be combined or separated for a given implementation and maybe performed by a greater number or fewer number of steps, processes, components, and devices.

When multiple user wearable devices 302 are being used, user A can hold down the user wearable device button 311, hereby initiating the exchange of user A's contact information with a user B. Simultaneously, user B holds down his/her user wearable device button 312, the simultaneous depression of multiple user wearable device buttons causing user A and user B to exchange a unique wireless device ID 328. The sensors 316 on the user wearable devices may automatically measure the physical distance between multiple users. The distance measurement is particularly useful in some embodiments when it is single directional, i.e. when two users are facing each other. When the measured distance meets a maximum pre-determined or preselected value, the data exchange and transmission in steps 328, 330 & 332 are allowed. The process of simultaneously pressing user wearable device buttons also causes user A's wearable device to transmit 330 a contact swap request along with user B's wireless device unique ID to the Data Compilation, Search, & Storage Systems. Similarly, this process also causes user B's wearable device to transmit 332 a contact swap request along with user A's wireless device unique ID to the Data Compilation, Search, & Storage Systems. Steps 330 & 332 can optionally include the transmission of physical distance measurements to the Data Compilation, Search, & Storage Systems. The Data Compilation, Search, & Storage Systems then receives both requests 432 and activates the user search engine to locate the data files of user A and user B 436.

The Data Compilation, Search, & Storage Systems 402 then activates the user search engine to locate the data files of user A and user B 436. The Data Compilation, Search, and Storage Systems 402 may deploy the location and time synchronization engine 418 and event search engine 416 to authenticate the proper event registration, and event location and time for the users' command to exchange contact information. The user to user distance search engine 432 may search a data file to find the matching distance measure for user wearable devices within a pre-determined or preselected distance.

Once user A and user B are properly authenticated by the Dara Compilation, Search, & Storage Systems 402, they are given permission to access each other's contact information 438. The Data Compilation, Search, & Storage Systems 402 then sends user A's contact information to user B's data file 442 and sends user B's contact information to user A's data file 444. The Data Compilation, Search, and Storage Systems 402, through the data searching, matching, and computation, may permit full access, limited access or no access to a user's data file, depending on their personal settings.

FIG. 10 is a schematic of a wearable device initiated display of event attendee's personal information, interests, and merchant advertising, according to one embodiment. FIG. 10 is an embodiment of a function of multitude of functions that the user wearable device may be capable of performing. More specifically, as an example, a single action via a user wearable device may automatically confirm a user's 102 event registration, display the event attendee's name, company, interests, and merchant information. FIG. 10 may be deployed in other ways and the operations performed and/or the services provided by such systems, components, devices, and services may be combined or separated for a given implementation and maybe performed by a greater number or fewer number of steps, processes, components, and devices.

The user can initiate the user wearable device display process by generating a command to the user control interface 310. It is appreciated that there can be many ways to generate a command, including pressing a button one or more times, pressing a button for a moment or a prolonged period, making a gesture on the display screen, speaking a command, smiling to the screen or by making a body movement. Commands generated through any of the aforementioned methods can be entered into the user wearable device 302 itself, a user wireless device 202 or any other appropriate device in communication with the user wearable device 302. Such an action can power on the device and send a user information display request 340 to the user wireless device 202. The user wireless device is then accessed by the user 710 and used to access the Data Compilation, Search, and Storage Systems 470 and access the user wireless device's GPS location 250.

The Data Complication, Search, and Storage Systems may start the location and time search engine 712, and event search engine 714 and search for events that match the location of the user wireless device 252. If there is no location match 256, the display 318 of the user wearable device 302 may then show a blank screen with no display of user information 342.

If there is a location match between the event as registered in the Data Compilation, Search, and Storage Systems 402 and User Wireless Device 202, the user wireless device may then determine whether the user 102 has registered for the event 258. To determine registration, the Data Compilation, Search, and Storage Systems 402, may then search the event search engine 714 and user search engine 716 to locate a match between the two data files. If there is no registration 260, the display 318 of the user wearable device 302 may then show a blank screen with no display of user information 342.

If the event registration is confirmed 262, the user wireless device may then determine whether the current time is within one hour, or another pre-determined or preselected time interval, of start time of the event 266. If more than one hour away 264, or more than the pre-determined or preselected time interval, the display 318 of the user wearable device 302 may then show a blank screen with no display of user information 342. If less than one hour away 268, the user wireless device accesses the user wireless device cache 718 and sends the user name, company, interests and merchants to the user wearable device 344. The user wearable device then displays the applicable information 360.

FIG. 11 is an example of graphic display of user information, interests, and merchant advertising according to one embodiment. FIG. 11 is an exemplary embodiment of the display 318 of the user wearable device 302. The content and graphic display of information serves as an example of multitude variations of the same or more content or graphic display. FIG. 11 may be deployed in other ways and the operations performed and/or the services provided by such systems, and information displayed may be combined or separated for a given implementation and maybe performed by a greater number or fewer items and components.

The user wearable device 302 may have one or more display(s)/screen(s) 318 and one or more user control interfaces 310. The user control interface 310 may perform one or more functions, such as powering on the device and displaying, in one embodiment, five rows of content—user interests 360, first name 362, last name 364, employer name, 366, and merchant information/logos 368, in one step. The user control interface 310 may also be used to facilitate the transfer of user 102 contact information with another user in one step as well.

The display 318 may be any suitable display, such as liquid crystal display (LCD), a light emitting diode (LED) based display or an organic light emitting diode (OLED) based display. In some embodiments, the display 318 may function as a touch screen through which the user 102 may interact with the user wearable device 302. A user could also interact with the user wearable device 302 through voice commands, facial expressions or movements of the body. Row 360 may be used to show the user's 102 personal passions and interests previously provided by the user 102, saved in the Data Compilation, Search, and Storage Systems 402, and cached by the user wireless device 202. Row 360 shows, for example, an interest in dogs, golf, skiing and sailing. Such interests may match the group concentrated interests, as searched and calculated by the user/group search engine 422. Row 360 may show, for another example, the user's 102 own unique interests which may be different from the overall group interests. Row 360 may also be rotated to show different interests through user initiated change or time sequenced and pre-programmed changes, among other methods.

Row 362 and Row 364 may be used to show the user's 102 first and last name. Row 366 may be used to show the name of user's 102 employer. Row 368 may be used to display the logos or advertisements of merchants that have purchased advertising space. Merchants listed on row 368 may be chosen through multiple methods, including proximity. In some embodiments, merchants will be able to place bids on the row 368 space and the merchants listed on the row 368 would be those with the highest bids. Row 368 may also be rotated to show different merchants and logos or other information.

In FIG. 12 is a flow chart 300-5 of the communication of information between two wearable devices, according to one embodiment. FIG. 12 may be deployed in other ways and the operations performed and/or the services provided by such systems, and information displayed may be combined or separated for a given implementation and maybe performed by a greater number or fewer items and components.

A process of FIG. 12 is initiated when a wireless device A sends a unique ID of wireless device A 810. A user A then holds down the button of a wearable device A, which is equipped with a Bluetooth® master A, wearable device A receives the unique ID from the user wearable device A, then wearable device A establishes a channel of communication #1 with a wearable device B and wearable device A sends the unique ID of wireless device A to wearable device B 812. A short range, single direction Bluetooth® channel with the master and slave is temporarily paired to create a channel of communication #1 814. A user B then holds down a button on wearable device B equipped with a Bluetooth® slave, wearable device B establishes a dedicated channel of communication #1 with wearable device A and the wearable device B receives the unique ID of wireless device A 816. Wireless device B then receives the unique ID of wireless device A 818.

Another process of FIG. 12 is initiated when a wireless device B sends a unique ID of wireless device B 820. User B then holds down the button of wearable device B, which is equipped with a Bluetooth® master B, wearable device B receives the unique ID from user wearable device B, then wearable device B establishes a channel of communication #2 with wearable device A and wearable device B sends the unique ID of wireless device B to the wearable device A 822. A short range, single direction Bluetooth® channel with the master and slave is temporarily paired to create a channel of communication #2 824. User A then holds down a button on wearable device A equipped with a Bluetooth® slave, wearable device A establishes a dedicated channel of communication #2 with wearable device B and wearable device A receives the unique ID of wireless device B 826. Wireless device A then receives the unique ID of wireless device B 828.

The devices disclosed herein can be described as:

1. A first user wearable device and second user wearable device, configured for a data transfer upon a simultaneous input, comprising:
   wherein the first user wearable device comprises a display electrically connected to a processor, an input switch electrically connected to the processor, and a wireless Master A module comprising a single direction short-range wireless antenna and a wireless Slave A module comprising a single direction short-range antenna, both electrically connected to the processor;
   wherein the second user wearable device comprises a display electrically connected to a processor, an input switch electrically connected to the processor, and a wireless Master B module comprising a single direction short-range wireless antenna and a wireless Slave B module comprising a single direction short-range antenna, both electrically connected to the processor;
   wherein the display on the first user wearable device is configured to display registrant information associated with a first user and the display on the second user wearable device is configured to display registrant information associated with a second user;
   wherein the single direction short-range antennas have a range of 1 foot to 10 feet, and are configured to have an aperture area that covers the upper torso of a person between the heights of 4 foot 11 inches and 6 foot 4 inches within a range of 1 foot to 10 feet of the antenna when the first user wearable device is worn on the first user's upper torso and when the second user wearable device is worn on the second user's upper torso;
   wherein the first user wearable device and second user wearable device are configured to transmit registrant information upon a simultaneous input via the first user wearable device input switch and the second user wearable device input switch; and
   wherein the simultaneous input establishes a first dedicated channel of communication by creating a temporary pairing between the Master A module and the Slave B module and a second dedicated channel of communication by creating a temporary pairing between the Master B module and the Slave A module.

2. The apparatus of claim 1, wherein the input switches comprise push-button switches.

3. The apparatus of claim 2, wherein the simultaneous input further comprises a verification that the first user and second user are within a location where an event is occurring and a verification that the first user and second user are registered for the event occurring.

4. The apparatus of claim 3, wherein the simultaneous input further comprises a verification that the first user is facing the second user.

5. The apparatus of claim 4, wherein the verification that the first user is facing the second user is accomplished through the use of a first directional sensor electrically connected to the processer of the first dynamic user wearable device and a second directional sensor electrically connected to the processer of the second user wearable device that capture the same aperture area as the single direction short range antennas.

6. The apparatus of claim 5, wherein the verification that the first user is facing the second user is further determined by verifying that the Master A antenna and Slave B antenna have overlapping coverage areas and that the Master B antenna and Slave A antenna have overlapping coverage areas.

7. The apparatus of claim 6, wherein the single direction short range antennas comprise a beamwidth optimized based on the radio frequencies deployed to generate an ideal aperture area that covers the average upper front torso of a human body between the heights of 4 foot 11 inches and 6 foot 4 inches.

8. The apparatus of claim 7, wherein the single direction short range antennas comprise a direction determined by the lobe of maximum electromagnetic waves or radiation as defined by azimuth and elevation angles.

What has been described are systems, methods and devices for single action automated personal event registration and information display, personal contact information exchange and merchant advertising. While this disclosure shows the invention in specific exemplary embodiments, persons of ordinary skill in the art will appreciate that all or part of the invention is capable of being used in other configurations or other applications. In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A first user wearable device and second user wearable device, configured for a data transfer upon a simultaneous input, comprising:
   wherein the first user wearable device comprises a display electrically connected to a processor, an input switch electrically connected to the processor, and a wireless Master A module comprising a single direction short-range wireless antenna and a wireless Slave A module comprising a single direction short-range antenna, both electrically connected to the processor;
   wherein the second user wearable device comprises a display electrically connected to a processor, an input switch electrically connected to the processor, and a wireless Master B module comprising a single direction short-range wireless antenna and a wireless Slave B module comprising a single direction short-range antenna, both electrically connected to the processor;

wherein the display on the first user wearable device is configured to display registrant information associated with a first user and the display on the second user wearable device is configured to display registrant information associated with a second user;

wherein the single direction short-range antennas have a range of 1 foot to 10 feet, and are configured to have an aperture area that covers the upper torso of a person between the heights of 4 foot 11 inches and 6 foot 4 inches within a range of 1 foot to 10 feet of the antenna when the first user wearable device is worn on the first user's upper torso and when the second user wearable device is worn on the second user's upper torso;

wherein the first user wearable device and second user wearable device are configured to transmit registrant information upon a simultaneous input via the first user wearable device input switch and the second user wearable device input switch; and wherein the simultaneous input establishes a first dedicated channel of communication by creating a temporary pairing between the Master A module and the Slave B module and a second dedicated channel of communication by creating a temporary pairing between the Master B module and the Slave A module.

2. The apparatus of claim 1, wherein the input switches comprise push-button switches.

3. The apparatus of claim 2, wherein the simultaneous input further comprises a verification that the first user and second user are within a location where an event is occurring and a verification that the first user and second user are registered for the event occurring.

4. The apparatus of claim 3, wherein the simultaneous input further comprises a verification that the first user is facing the second user.

5. The apparatus of claim 4, wherein the verification that the first user is facing the second user is accomplished through the use of a first directional sensor electrically connected to the processer of the first dynamic user wearable device and a second directional sensor electrically connected to the processer of the second user wearable device that capture the same aperture area as the single direction short range antennas.

6. The apparatus of claim 5, wherein the verification that the first user is facing the second user is further determined by verifying that the Master A antenna and Slave B antenna have overlapping coverage areas and that the Master B antenna and Slave A antenna have overlapping coverage areas.

7. The apparatus of claim 6, wherein the single direction short range antennas comprise a beamwidth optimized based on the radio frequencies deployed to generate an ideal aperture area that covers the average upper front torso of a human body between the heights of 4 foot 11 inches and 6 foot 4 inches.

8. The apparatus of claim 7, wherein the single direction short range antennas comprise a direction determined by the lobe of maximum electromagnetic waves or radiation as defined by azimuth and elevation angles.

* * * * *